United States Patent
Miyamoto (10) Patent No.: US 9,625,701 B2
(45) Date of Patent: Apr. 18, 2017

(54) OCULAR OPTICAL SYSTEM AND FINDER OPTICAL SYSTEM

(71) Applicant: Panasonic Intellectual Property Management Co., Ltd., Osaka (JP)

(72) Inventor: Tomoaki Miyamoto, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 25 days.

(21) Appl. No.: 14/690,822

(22) Filed: Apr. 20, 2015

(65) Prior Publication Data

US 2015/0226954 A1 Aug. 13, 2015

Related U.S. Application Data (63) Continuation of application No. PCT/JP2012/007249, filed on Nov. 12, 2012.

(51) Int. Cl.
*G02B 25/00* (2006.01)
*H04N 5/225* (2006.01)

(52) U.S. Cl.
CPC ........... *G02B 25/001* (2013.01); *G02B 25/00* (2013.01); *H04N 5/2254* (2013.01)

(58) Field of Classification Search
CPC ........ G02B 25/001; G02B 25/00; G02B 9/12; H04N 5/2254
See application file for complete search history.

(56) References Cited

U.S. PATENT DOCUMENTS

2009/0279182 A1 11/2009 Matsuda
2010/0290129 A1 11/2010 Nishio et al.

FOREIGN PATENT DOCUMENTS

| JP | 9-329752 | 12/1997 | |
| JP | 2000-180920 | 6/2000 | |
| JP | 2006-227120 | 8/2006 | |
| JP | 2009-271385 | 11/2009 | |
| JP | 2010-237430 | * 10/2010 | ............ G02B 25/00 |
| JP | 2010-266776 | 11/2010 | |
| JP | 2011-197492 | 10/2011 | |
| JP | 2012-042844 | 3/2012 | |

OTHER PUBLICATIONS

International Search Report issued Feb. 19, 2013 in International (PCT) Application No. PCT/JP2012/007249.

* cited by examiner

*Primary Examiner* — Joseph P Martinez
(74) *Attorney, Agent, or Firm* — Wenderoth, Lind & Ponack, L.L.P.

(57) ABSTRACT

An ocular optical system comprising at least five lens elements, and including, in order from a display surface side to an exit side, a first lens unit having negative optical power, a second lens unit having positive optical power, and a third lens unit having positive optical power, wherein the second lens unit moves along an optical axis for adjustment of diopter scale, and a finder optical system comprising a display device having a display surface on which an image is displayed, and the above-mentioned ocular optical system.

8 Claims, 9 Drawing Sheets

OCULAR OPTICAL SYSTEM AND FINDER OPTICAL SYSTEM

CROSS-REFERENCE TO RELATED APPLICATION

This application is a Continuation of International Application No. PCT/JP2012/007249, filed on Nov. 12, 2012, the disclosure of which application is incorporated by reference herein.

BACKGROUND

Field

The present disclosure relates to ocular optical systems and finder optical systems.

Description of the Related Art

In digital cameras such as digital still cameras, digital video cameras, digital single-lens reflex cameras, and mirrorless single-lens cameras, a finder optical system such as an optical finder and an electronic view finder is provided with an ocular optical system for enlarging an image displayed on an image display surface in the camera. Since the finder optical system is required to observe an image in a larger scale, it is necessary to increase the size of the image display surface or increase the magnification of the ocular optical system. However, an increase in the size of the image display surface causes an increase in the size of the finder optical system. Therefore, it is desired to increase the magnification of the ocular optical system while realizing size reduction of the finder optical system.

Japanese Laid-Open Patent Publication No. 2012-042844 discloses an ocular optical system, in order from a display surface side to an exit side, comprising: a first lens unit composed of a single lens having positive refractive power; a second lens unit composed of a bi-concave single lens having negative refractive power; and a third lens unit composed of a bi-convex single lens having positive refractive power.

Japanese Laid-Open Patent Publication No. 2011-197492 discloses an ocular optical system, in order from a display surface side to an exit side, comprising: a first lens unit composed of a meniscus lens having negative refractive power; a second lens unit having positive refractive power; and a third lens unit having positive or negative refractive power and composed of two lenses.

Japanese Laid-Open Patent Publication No. 2010-266776 discloses an ocular optical system, in order from a display surface side to an exit side, comprising: a first lens unit composed of a meniscus lens having positive refractive power; a second lens unit composed of a meniscus lens having negative refractive power; and a third lens unit composed of a single lens having positive refractive power.

SUMMARY

The present disclosure provides an ocular optical system having a short focal length, a wide view angle, a high magnification, and excellent optical performance while being small in size. Further, the present disclosure provides a compact finder optical system including the ocular optical system.

The novel concepts disclosed herein were achieved in order to solve the foregoing problems in the related art, and herein is disclosed:

an ocular optical system comprising at least five lens elements, and including, in order from a display surface side to an exit side, a first lens unit having negative optical power, a second lens unit having positive optical power, and a third lens unit having positive optical power, wherein the second lens unit moves along an optical axis for adjustment of diopter scale.

The novel concepts disclosed herein were achieved in order to solve the foregoing problems in the related art, and herein is disclosed:

a finder optical system comprising:

a display device having a display surface on which an image is displayed; and an ocular optical system, wherein the ocular optical system comprises at least five lens elements, and includes, in order from a display surface side to an exit side, a first lens unit having negative optical power, a second lens unit having positive optical power, and a third lens unit having positive optical power, wherein the second lens unit moves along an optical axis for adjustment of diopter scale.

The ocular optical system according to the present disclosure has a short focal length, a wide view angle, a high magnification, and excellent optical performance while being small in size.

BRIEF DESCRIPTION OF THE DRAWINGS

This and other objects and features of the present disclosure will become clear from the following description, taken in conjunction with the exemplary embodiments with reference to the accompanied drawings in which.

DETAILED DESCRIPTION

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicant provides the attached drawings and the following description so that those skilled in the art can fully understand this disclosure. Therefore, the drawings and description are not intended to limit the subject defined by the claims.

Embodiments 1 to 4

FIGS. 1, 3, 5 and 7 are lens arrangement diagrams of ocular optical systems according to Embodiments 1 to 4, respectively. In each Fig., part (a) shows a lens configuration when the diopter scale is −1 diopter, part (b) shows a lens configuration when the diopter scale is −4 diopter, and part (c) shows a lens configuration when the diopter scale is +4 diopter.

In each Fig., symbol (+) or (−) imparted to the symbol of each lens unit corresponds to the sign of the optical power of the lens unit. An arrow imparted to each lens unit indicates the movement of the lens unit when the diopter scale is adjusted. That is, in FIGS. 1, 3, 5 and 7, the arrow indicates a direction in which a second lens unit G2 described later moves for adjustment of diopter scale.

Figure 1:
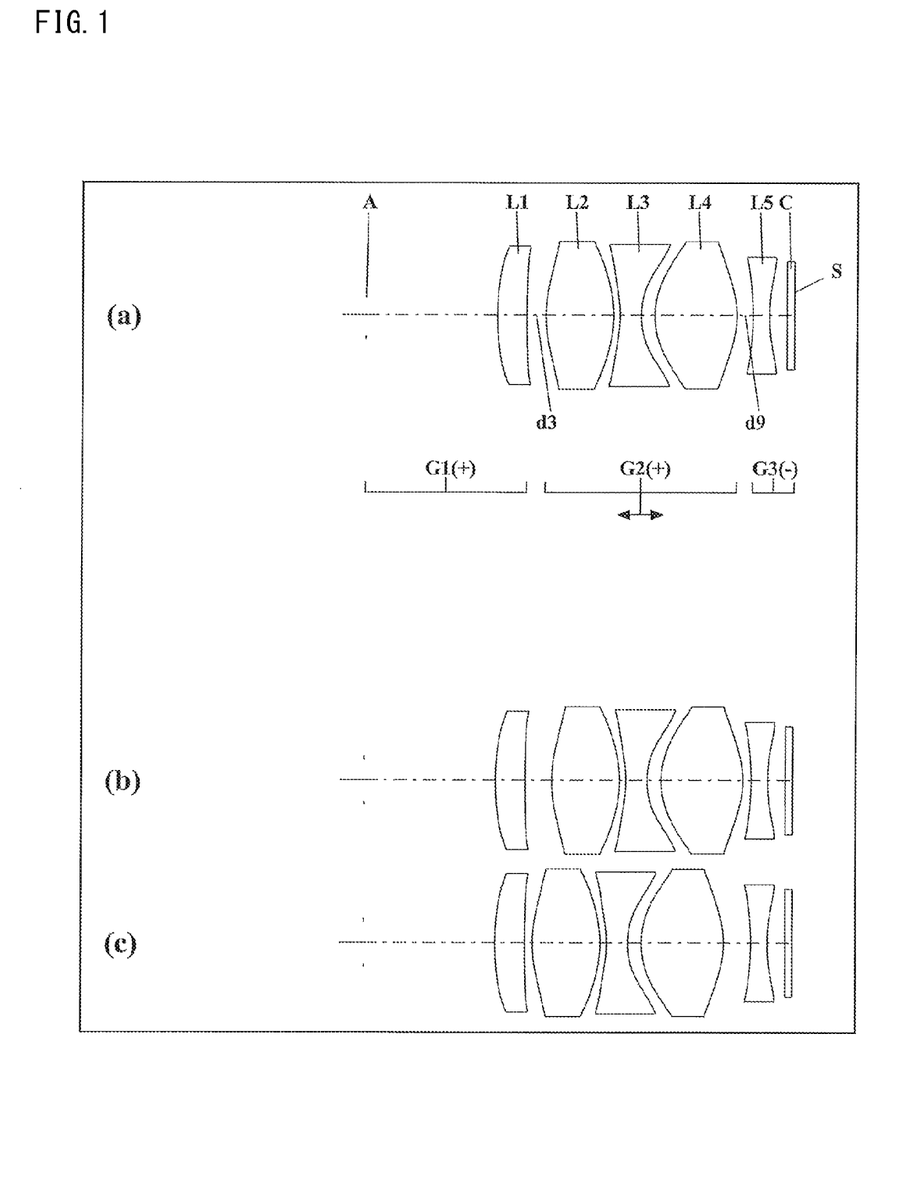
FIG. 1 is a lens arrangement diagram of an ocular optical system according to Embodiment 1 (Numerical Example 1)
Figure 2:
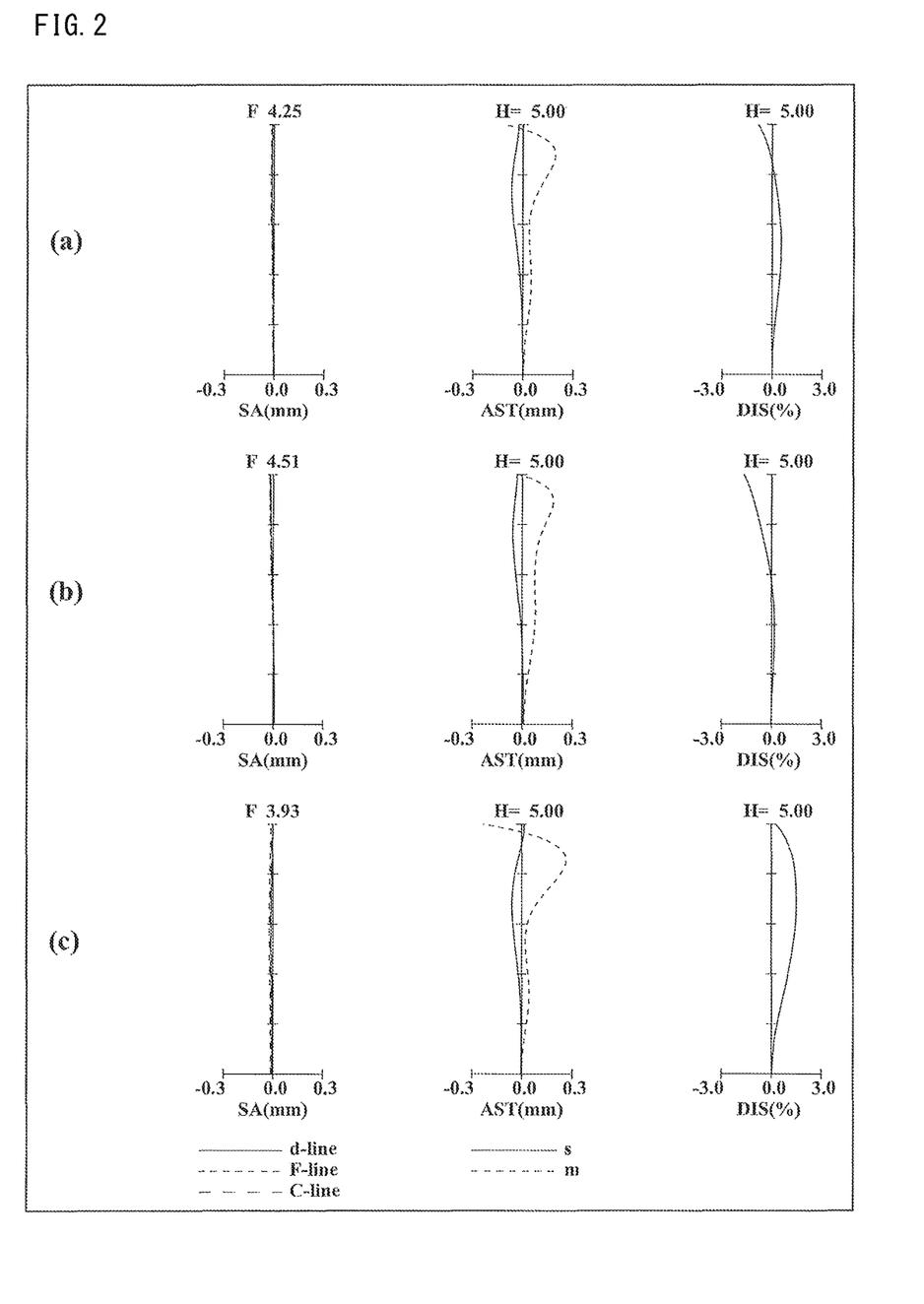
FIG. 2 is a longitudinal aberration diagram of the ocular optical system according to Numerical Example 1.
Figure 3:
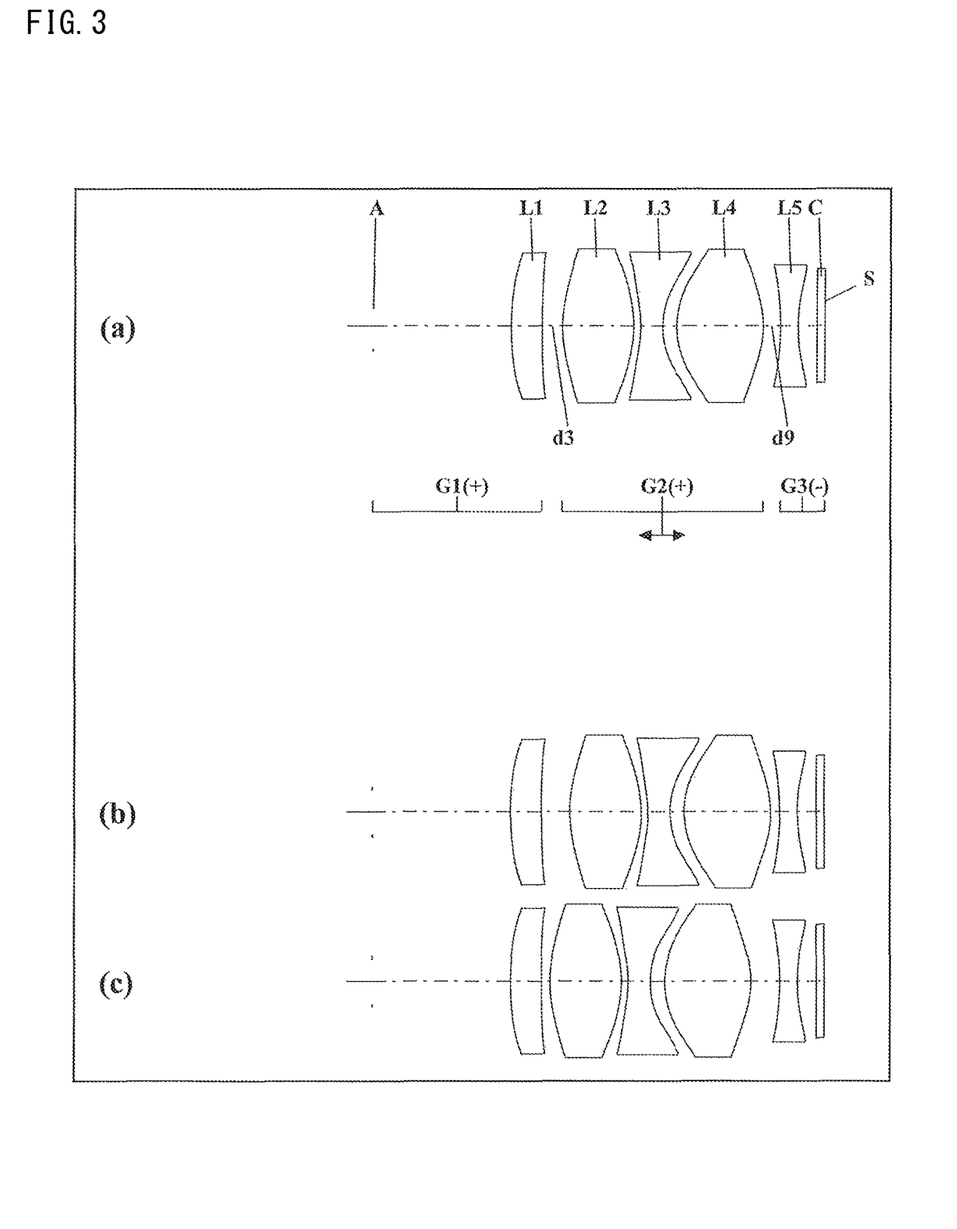
FIG. 3 is a lens arrangement diagram of an ocular optical system according to Embodiment 2 (Numerical Example 2)
Figure 4:
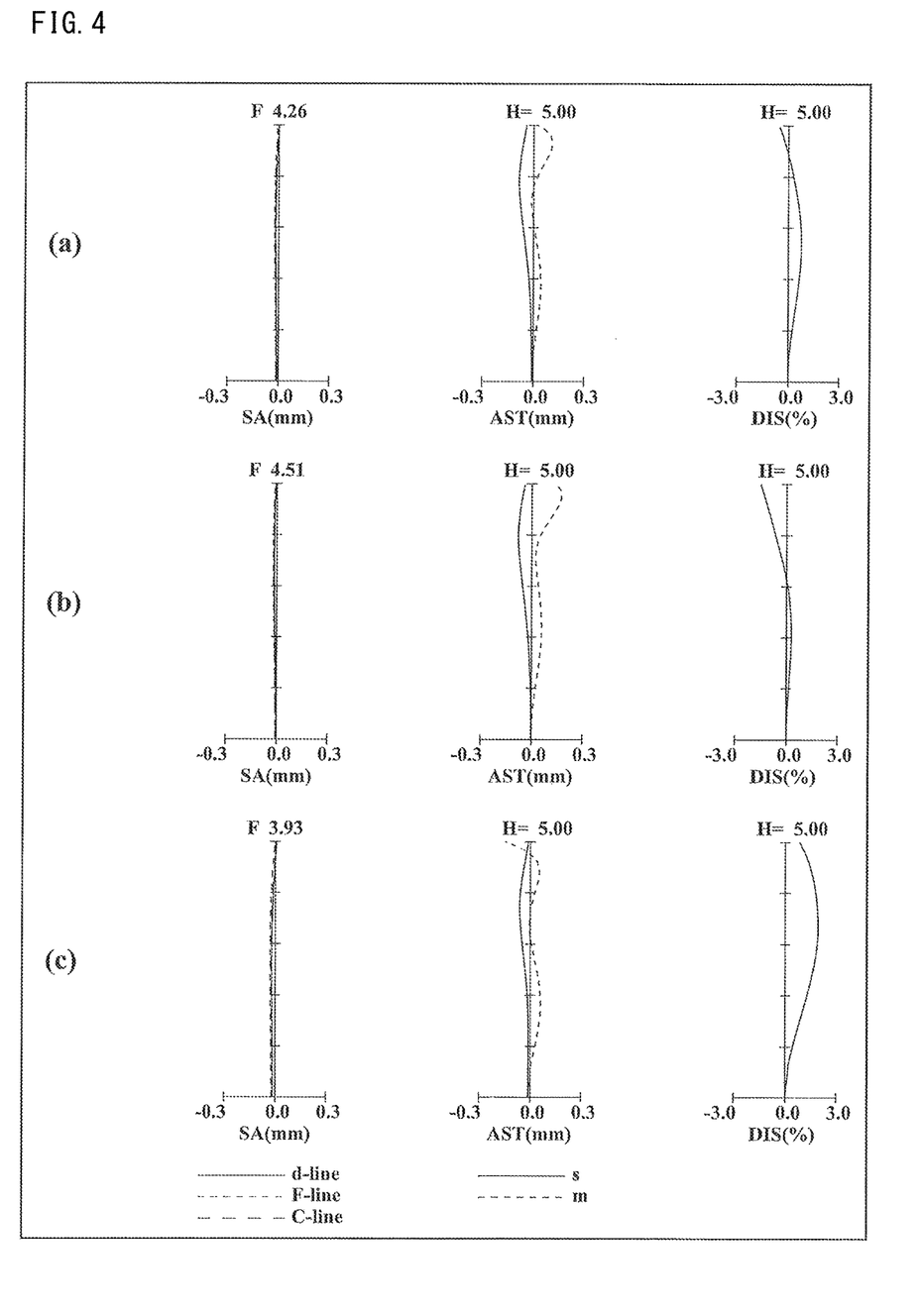
FIG. 4 is a longitudinal aberration diagram of the ocular optical system according to Numerical Example 2.

Each of the ocular optical systems according to the respective embodiments, in order from a display surface S side to an exit side (eye point (virtual diaphragm) A side), includes a first lens unit G3 having negative optical power, a second lens unit G2 having positive optical power, and a third lens unit G1 having positive optical power. As shown in FIGS. 1 and 3, in the ocular optical systems according to Embodiments 1 and 2, a cover glass C is provided on the display surface S.

Embodiment 1

As shown in FIG. 1, the first lens unit G3 comprises solely a bi-concave first lens element L5. The first lens element L5 has two aspheric surfaces.

The second lens unit G2, in order from the display surface S side to the exit side, comprises a bi-convex second lens element L4, a bi-concave third lens element L3, and a bi-convex fourth lens element L2. The second lens element L4, the third lens element L3, and the fourth lens element L2 each have two aspheric surfaces.

The third lens unit G1 comprises solely a positive meniscus fifth lens element L1 with the convex surface facing the exit side. The fifth lens element L1 has two aspheric surfaces.

In the ocular optical system according to Embodiment 1, when adjusting the diopter scale from +4 diopter to −4 diopter, the second lens unit G2 moves along the optical axis to the display surface S side. Further, when adjusting the diopter scale from −4 diopter to +4 diopter, the second lens unit G2 moves along the optical axis to the exit side. That is, the second lens unit G2 moves to the display surface S side to decrease the diopter scale, and moves to the exit side to increase the diopter scale.

Embodiment 2

As shown in FIG. 3, the first lens unit G3 comprises solely a bi-concave first lens element L5. The first lens element L5 has two aspheric surfaces.

The second lens unit G2, in order from the display surface S side to the exit side, comprises a bi-convex second lens element L4, a bi-concave third lens element L3, and a bi-convex fourth lens element L2. The second lens element L4, the third lens element L3, and the fourth lens element L2 each have two aspheric surfaces.

The third lens unit G1 comprises solely a positive meniscus fifth lens element L1 with the convex surface facing the exit side. The fifth lens element L1 has two aspheric surfaces.

In the ocular optical system according to Embodiment 2, when adjusting the diopter scale from +4 diopter to −4 diopter, the second lens unit G2 moves along the optical axis to the display surface S side. Further, when adjusting the diopter scale from −4 diopter to +4 diopter, the second lens unit G2 moves along the optical axis to the exit side. That is, the second lens unit G2 moves to the display surface S side to decrease the diopter scale, and moves to the exit side to increase the diopter scale.

Embodiment 3

Figure 5:
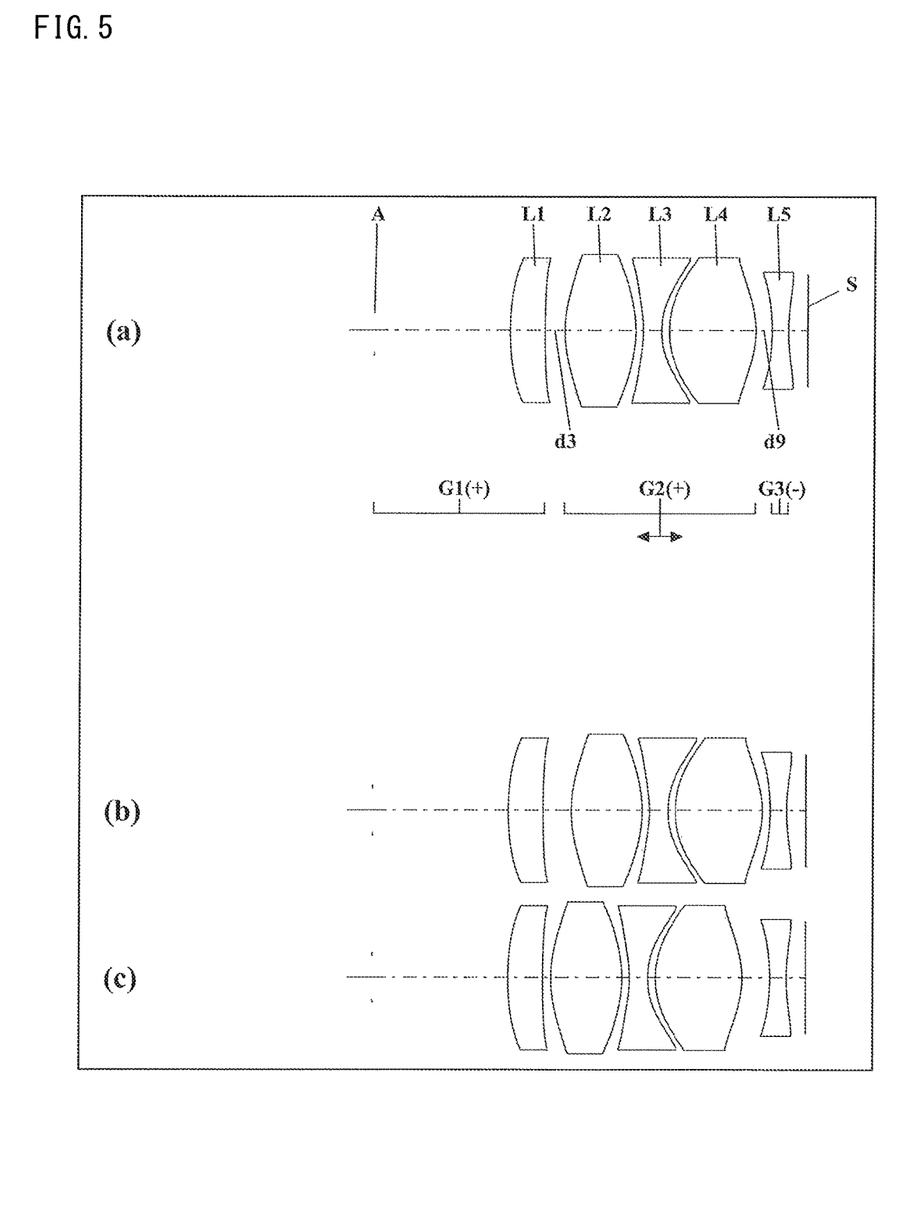
FIG. 5 is a lens arrangement diagram of an ocular optical system according to Embodiment 3 (Numerical Example 3)
Figure 6:
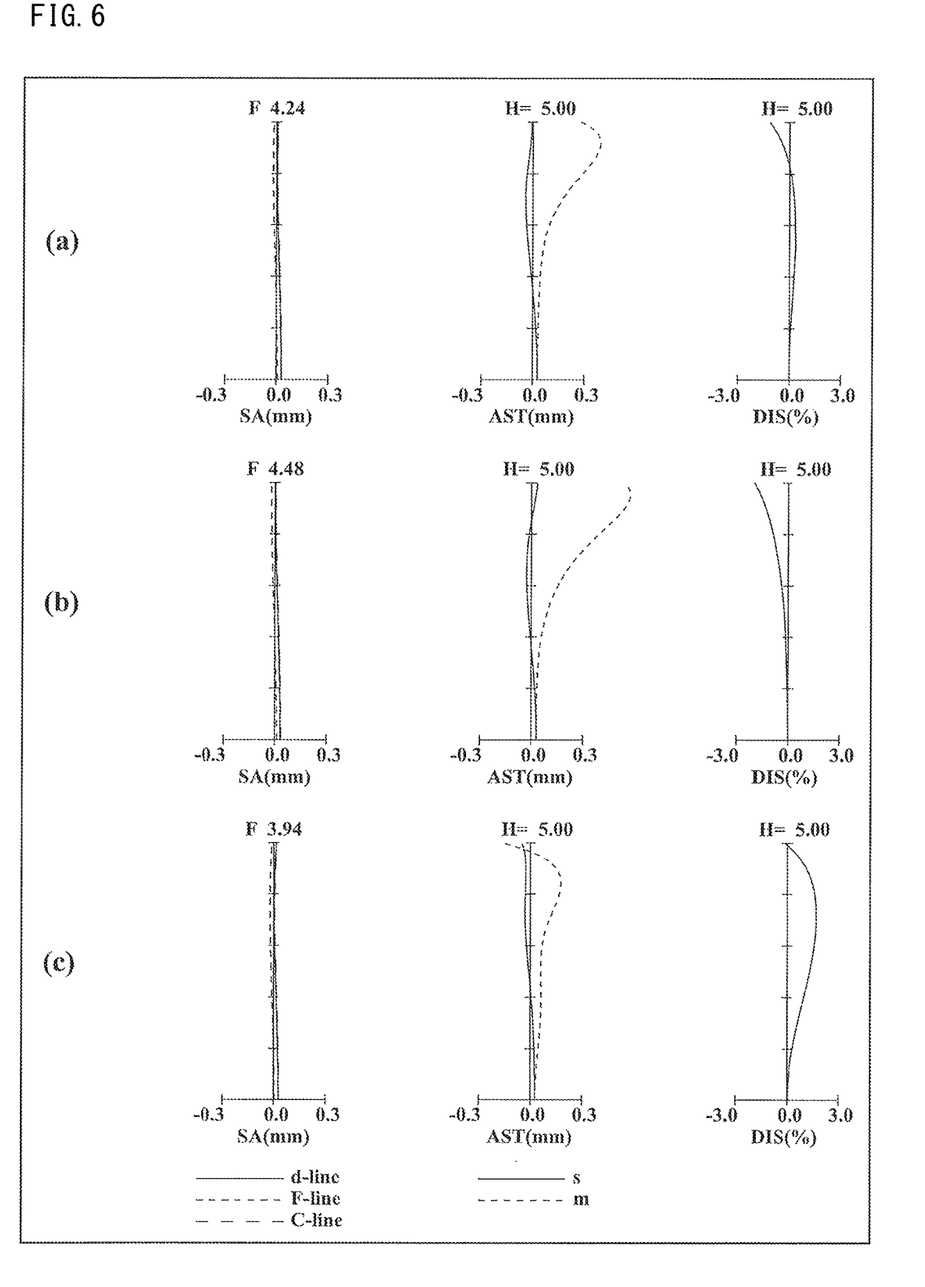
FIG. 6 is a longitudinal aberration diagram of the ocular optical system according to Numerical Example 3.

As shown in FIG. 5, the first lens unit G3 comprises solely a bi-concave first lens element L5. The first lens element L5 has two aspheric surfaces.

The second lens unit G2, in order from the display surface S side to the exit side, comprises a bi-convex second lens element L4, a bi-concave third lens element L3, and a bi-convex fourth lens element L2. The second lens element L4, the third lens element L3, and the fourth lens element L2 each have two aspheric surfaces.

The third lens unit G1 comprises solely a positive meniscus fifth lens element L1 with the convex surface facing the exit side. The fifth lens element L1 has two aspheric surfaces.

In the ocular optical system according to Embodiment 3, when adjusting the diopter scale from +4 diopter to −4 diopter, the second lens unit G2 moves along the optical axis to the display surface S side. Further, when adjusting the diopter scale from −4 diopter to +4 diopter, the second lens unit G2 moves along the optical axis to the exit side. That is, the second lens unit G2 moves to the display surface S side to decrease the diopter scale, and moves to the exit side to increase the diopter scale.

Embodiment 4

Figure 7:
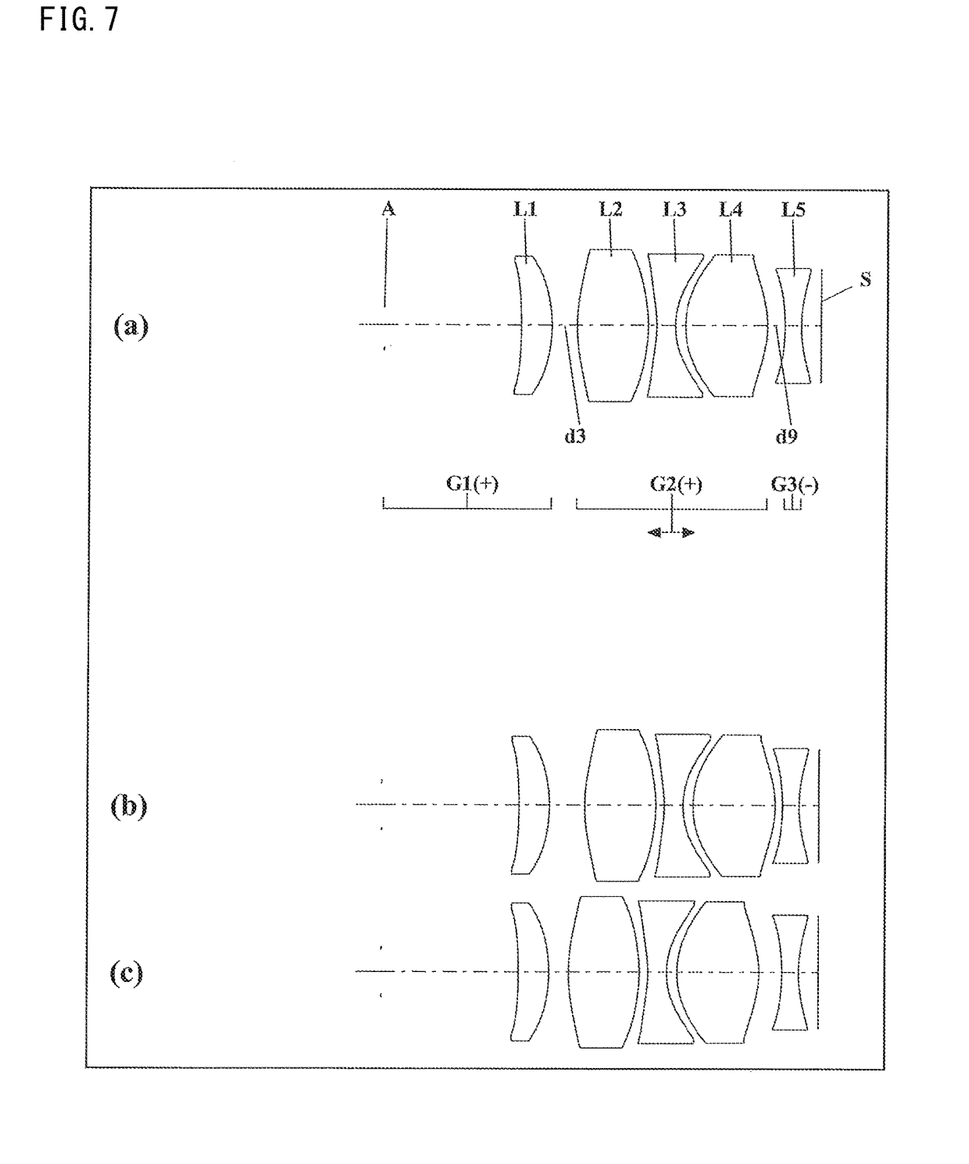
FIG. 7 is a lens arrangement diagram of an ocular optical system according to Embodiment 4 (Numerical Example 4)
Figure 8:
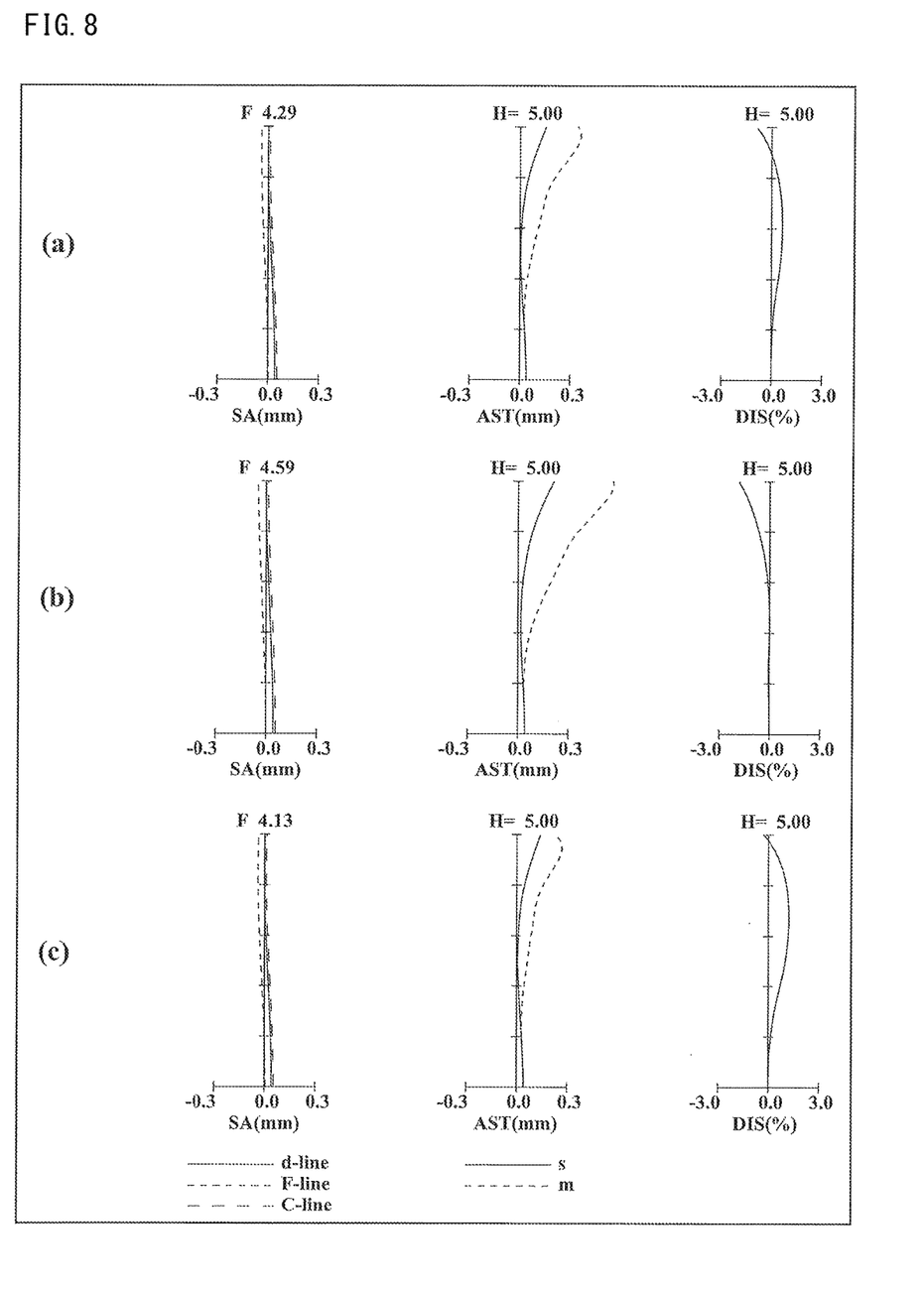
FIG. 8 is a longitudinal aberration diagram of the ocular optical system according to Numerical Example 4.

As shown in FIG. 7, the first lens unit G3 comprises solely a bi-concave first lens element L5. The first lens element L5 has two aspheric surfaces.

The second lens unit G2, in order from the display surface S side to the exit side, comprises a bi-convex second lens element L4, a bi-concave third lens element L3, and a bi-convex fourth lens element L2. The second lens element L4, the third lens element L3, and the fourth lens element L2 each have two aspheric surfaces.

The third lens unit G1 comprises solely a positive meniscus fifth lens element L1 with the convex surface facing the display surface S side. The fifth lens element L1 has two aspheric surfaces.

In the ocular optical system according to Embodiment 4, when adjusting the diopter scale from +4 diopter to −4 diopter, the second lens unit G2 moves along the optical axis to the display surface S side. Further, when adjusting the diopter scale from −4 diopter to +4 diopter, the second lens unit G2 moves along the optical axis to the exit side. That is, the second lens unit G2 moves to the display surface S side to decrease the diopter scale, and moves to the exit side to increase the diopter scale.

As described above, each of the ocular optical systems according to Embodiments 1 to 4 is composed of five lens elements. However, in the present disclosure, the number of lens elements constituting each ocular optical system is not particularly limited as long as it is at least five. Further, in the ocular optical systems according to Embodiments 1 to 4, each of the first lens unit G3 and the third lens unit G1 is composed of one lens element, and the second lens unit G2 is composed of three lens elements. However, in the present disclosure, the number of lens elements constituting each lens unit is not particularly limited.

In the ocular optical systems according to Embodiments 1 to 4, the second lens unit G2 which moves for adjustment of diopter scale is composed of three lens elements, and the three lens elements are, in order from the display surface S side to the exit side, a lens element having positive optical power, a lens element having negative optical power, and a lens element having positive optical power. Therefore, the ocular optical systems are advantageous in compensation of chromatic aberration, spherical aberration, coma aberration, and astigmatism.

As described above, Embodiments 1 to 4 have been described as examples of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

The following description is given for conditions that an ocular optical system like the ocular optical systems according to Embodiments 1 to 4 beneficially satisfies. A plurality of beneficial conditions is set forth for the ocular optical system according to each embodiment. A construction of the ocular optical system that satisfies all the plurality of conditions is most effective. However, when an individual condition is satisfied, an ocular optical system having the corresponding effect is obtained.

For example, in an ocular optical system, like the ocular optical systems according to Embodiments 1 to 4, comprising at least five lens elements, and including, in order from the display surface side to the exit side, a first lens unit having negative optical power, a second lens unit having positive optical power, and a third lens unit having positive optical power, in which the second lens unit moves along the optical axis for adjustment of diopter scale (hereinafter this lens configuration is referred to as a basic configuration of the embodiments), it is beneficial to satisfy the following condition (1):

$$0 < (f)^2/(DSP \times Ld) < 5.0 \qquad (1)$$

where f is the focal length of the entire ocular optical system when the diopter scale is −1 diopter;

DSP is the axial distance between the first lens unit and the third lens unit (the optical axial distance between a lens surface, closest to the exit side, of the first lens unit and a lens surface, closest to the display surface side, of the third lens unit); and Ld is the maximum height of the display surface.

The condition (1) sets forth the ratio of the square of the focal length of the entire system when the diopter scale is −1 diopter, to a value obtained by multiplying the axial distance between the first lens unit and the third lens unit (that is, the movable range of the second lens unit at the time of adjustment of diopter scale) and the maximum height of the display surface. When the value is outside the range of the condition (1), the range for adjustment of diopter scale is reduced, which makes is difficult to cope with users having various visions such as myopia, hyperopia, and the like. Further, when the value is outside the range of the condition (1), the focal length of the entire system is increased, and the magnification is reduced, which makes it difficult to observe the details of the object.

When at least one of the following conditions (1-1)' and (1-1)" is satisfied, the above-mentioned effect is achieved more successfully.

$$2.0 < (f)^2/(DSP \times Ld) \qquad (1\text{-}1)'$$

$$(f)^2/(DSP \times Ld) < 4.0 \qquad (1\text{-}1)''$$

Further, when at least one of the following conditions (1-2)' and (1-2)" is satisfied, the above-mentioned effect is achieved more successfully.

$$2.5 < (f)^2/(DSP \times Ld) \qquad (1\text{-}2)'$$

$$(f)^2/(DSP \times Ld) < 3.5 \qquad (1\text{-}2)''$$

For example, it is beneficial for an ocular optical system having the basic configuration like the ocular optical systems according to Embodiments 1 to 4 to satisfy the following condition (2):

$$0 < D/f < 3.0 \qquad (2)$$

where

D is the optical axial distance from the display surface to a lens surface closest to the exit side, and f is the focal length of the entire ocular optical system when the diopter scale is −1 diopter.

The condition (2) sets forth the ratio of the optical axial distance from the display surface to the lens surface closest to the exit side (that is, the overall length of the optical system), to the focal length of the entire system when the diopter scale is −1 diopter. When the value is outside the range of the condition (2), the overall length of the optical system is increased, which makes it difficult to provide a compact ocular optical system. Further, when the value is outside the range of the condition (2), the focal length of the entire system is excessively short, which makes it difficult to appropriately compensate aberrations.

When at least one of the following conditions (2-1)' and (2-1)" is satisfied, the above-mentioned effect is achieved more successfully.

$$0.5 < D/f \qquad (2\text{-}1)'$$

$$D/f < 2.5 \qquad (2\text{-}1)''$$

When at least one of the following conditions (2-2)' and (2-2)" is satisfied, the above-mentioned effect is achieved more successfully.

$$0.8 < D/f \qquad (2\text{-}2)'$$

$$D/f < 1.8 \qquad (2\text{-}2)''$$

For example, it is beneficial for an ocular optical system having the basic configuration like the ocular optical systems according to Embodiments 1 to 4 to satisfy the following condition (3):

$$0 < D_1/Ld < 2.0 \qquad (3)$$

where $D_1$ is the optical axial distance from the display surface to the lens surface, closest to the display surface side, of the first lens unit, and Ld is the maximum height of the display surface.

The condition (3) sets forth the ratio of the optical axial distance from the display surface to the lens surface, closest to the display surface side, of the first lens unit, to the maximum height of the display surface. When the value is outside the range of the condition (3), it is difficult to reduce the focal length of the entire system, which makes it difficult to increase the magnification. Further, when the value is outside the range of the condition (3), it is difficult to compensate curvature of field.

When the following condition (3-1) is satisfied, the above-mentioned effect is achieved more successfully.

$$0<D_1/Ld<1.3 \tag{3-1}$$

Further, when the following condition (3-2) is satisfied, the above-mentioned effect is achieved more successfully.

$$0<D_1/Ld<0.8 \tag{3-2}$$

For example, it is beneficial for an ocular optical system having the basic configuration like the ocular optical systems according to Embodiments 1 to 4 to satisfy the following condition (4):

$$0<f_2/f<2.0 \tag{4}$$

where $f_2$ is the focal length of the second lens unit, and
f is the focal length of the entire ocular optical system when the diopter scale is −1 diopter.

The condition (4) sets forth the ratio of the focal length of the second lens unit to the focal length of the entire system when the diopter scale is −1 diopter. When the value is outside the range of the condition (4), it is difficult to compensate various aberrations including curvature of field.

When at least one of the following conditions (4-1)' and (4-1)" is satisfied, the above-mentioned effect is achieved more successfully.

$$0.2 \leq f_2/f \tag{4-1)'}$$

$$f_2/f<1.5 \tag{4-1)"}$$

Further, when at least one of the following conditions (4-2)' and (4-2)" is satisfied, the above-mentioned effect is achieved more successfully.

$$0.5 \leq f_2/f \tag{4-2)'}$$

$$f_2/f<1.2 \tag{4-2)"}$$

Embodiment 5

Figure 9:
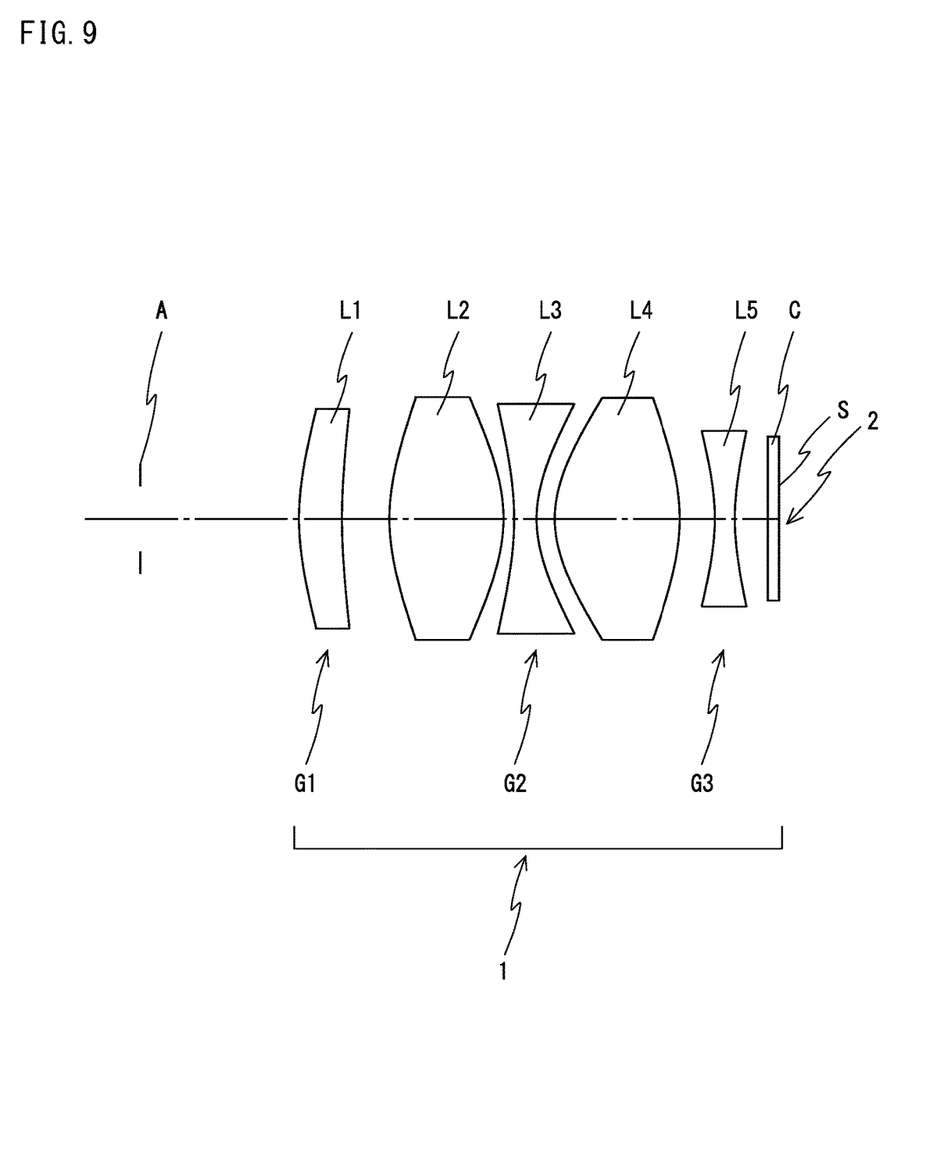
FIG. 9 is a schematic cross-sectional view of a finder optical system according to Embodiment 5.

FIG. 9 is a schematic cross-sectional view of a finder optical system according to Embodiment 5. As shown in FIG. 9, the finder optical system includes a display device 2, such as a liquid crystal display device, having a display surface S on which an image is displayed, and an ocular optical system 1. The ocular optical system according to Embodiment 1 is adopted as the ocular optical system 1. In FIG. 9, the ocular optical system 1, in order from the display surface S side, comprises a first lens unit G3, a second lens unit G2, and a third lens unit G1.

By adopting the ocular optical system according to Embodiment 1 as the ocular optical system, it is possible to provide a compact finder optical system ensuring a wide view angle and a high magnification. As the finder optical system shown in FIG. 9, any of the ocular optical systems according to Embodiments 2 to 4 may be adopted instead of the ocular optical system according to Embodiment 1.

The finder optical system according to the present disclosure may include: image inversion means, such as pentaprism or pentamirror, for inverting an inverted image formed by an objective lens to an erect image; a superimpose display plate; an electronic display device provided with an organic EL or a liquid crystal; and the like, according to need. Further, the finder optical system according to the present disclosure may be configured as a finder, such as an optical finder or an electronic view finder, provided in various digital cameras or the like.

As described above, Embodiment 5 has been described as examples of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

Numerical examples are described below in which the ocular optical systems according to Embodiments 1 to 4 are implemented. Here, in the numerical examples, the units of length are all "mm", while the unit of diopter scale is "diopter". Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression.

$$Z = \frac{h^2/r}{1+\sqrt{1-(1+\kappa)(h/r)^2}} + \sum A_n h^n$$

Here, the symbols in the formula indicate the following quantities.

Z is a distance from a point on an aspherical surface at a height h relative to the optical axis to a tangential plane at the vertex of the aspherical surface, h is a height relative to the optical axis, r is a radius of curvature at the top, κ is a conic constant, and $A_n$ is a n-th order aspherical coefficient.

FIGS. 2, 4, 6 and 8 are longitudinal aberration diagrams of the ocular optical systems according to Numerical Examples 1 to 4, respectively.

In each longitudinal aberration diagram, part (a) shows the aberration when the diopter scale is −1 diopter, part (b) shows the aberration when the diopter scale is −4 diopter, and part (c) shows the aberration when the diopter scale is +4 diopter. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the display surface height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the display surface height (in each Fig., indicated as H).

Numerical Example 1

The ocular optical system of Numerical Example 1 corresponds to Embodiment 1 shown in FIG. 1. Table 1 shows the surface data of the ocular optical system of Numerical Example 1. Table 2 shows the aspherical data. Table 3 shows the various data.

TABLE 1

(Surface data)

| Surface number | r | d | nd | vd |
|---|---|---|---|---|
| 0 | ∞ | Variable | | |
| 1(Virtual diaphragm) | ∞ | 12.50000 | | |
| 2* | 26.72450 | 2.82000 | 1.52470 | 56.2 |
| 3* | 99.86820 | Variable | | |
| 4* | 12.35610 | 6.48000 | 1.52470 | 56.2 |
| 5* | −10.20560 | 0.61000 | | |
| 6* | −10.45270 | 2.01000 | 1.58387 | 30.9 |
| 7* | 8.33380 | 1.29000 | | |
| 8* | 8.28700 | 7.80000 | 1.52470 | 56.2 |
| 9* | −8.54230 | Variable | | |
| 10* | −25.72510 | 1.58000 | 1.58387 | 30.9 |
| 11* | 16.68570 | 1.70000 | | |
| 12 | ∞ | 0.70000 | 1.50997 | 61.6 |
| Display surface | ∞ | | | |

TABLE 2

(Aspherical data)

Surface No. 2

K = 0.00000E+00, A4 = 3.30583E−05, A6 = 5.12835E−06,
A8 = −9.57265E−08 A10 = 1.06981E−09, A12 = −4.81724E−12,
A14 = 0.00000E+00, A16 = 0.00000E+00
Surface No. 3

K = 0.00000E+00, A4 = −9.16406E−05, A6 = 2.49825E−06,
A8 = 6.53783E−08 A10 = −8.47733E−10, A12 = 1.39883E−12,
A14 = 0.00000E+00, A16 = 0.00000E+00
Surface No. 4

K = −2.09483E−01, A4 = −1.63310E−04, A6 = −1.70600E−05,
A8 = 4.44704E−07 A10 = −4.14681E−09, A12 = 1.21886E−11,
A14 = 1.47347E−14, A16 = 0.00000E+00
Surface No. 5

K = −4.48592E−01, A4 = 7.74310E−04, A6 = −1.84295E−05,
A8 = 1.49514E−07 A10 = 1.36694E−09, A12 = −1.85567E−11,
A14 = 3.92931E−14, A16 = 0.00000E+00
Surface No. 6

K = −5.30691E−02, A4 = 1.54595E−03, A6 = −1.60417E−05,
A8 = −6.05308E−07 A10 = 1.74139E−08, A12 = −1.25407E−10,
A14 = 7.13272E−16, A16 = 1.12151E−15
Surface No. 7

K = −1.86344E−01, A4 = 1.34981E−03, A6 = −6.02403E−05,
A8 = 5.60238E−07 A10 = 2.12328E−09, A12 = −6.30360E−11,
A14 = 2.38237E−13, A16 = 0.00000E+00
Surface No. 8

K = −2.49786E−01, A4 = 4.10631E−04, A6 = −2.82129E−05,
A8 = 5.38944E−07 A10 = −5.47077E−09, A12 = 4.81917E−12,
A14 = 1.28492E−13, A16 = 0.00000E+00
Surface No. 9

K = −3.17989E−01, A4 = 7.84156E−04, A6 = −5.88666E−06,
A8 = 1.51712E−07 A10 = −3.70370E−09, A12 = 3.47845E−11,
A14 = −1.13322E−13, A16 = 0.00000E+00
Surface No. 10

K = 0.00000E+00, A4 = 7.93521E−05, A6 = 2.84771E−07,
A8 = −2.09783E−08 A10 = −4.72961E−09, A12 = 3.24039E−11,
A14 = 1.69442E−12, A16 = 0.00000E+00
Surface No. 11

K = 0.00000E+00, A4 = 5.77264E−05, A6 = −4.49937E−07,
A8 = −6.62074E−07 A10 = 5.01708E−09, A12 = 2.81760E−10,
A14 = −3.58105E−12, A16 = 0.00000E+00

TABLE 3

(Various data)

| Diopter scale | −1 | −4 | +4 |
|---|---|---|---|
| Focal length | 17.0339 | 18.1118 | 15.6904 |
| Pupil diameter | 4.0000 | 4.0000 | 4.0000 |
| Maximum height of display surface | 5.0000 | 5.0000 | 5.0000 |
| Overall length of optical system | 40.8369 | 40.8369 | 40.8369 |
| d0 | −1000.0000 | −250.0000 | 250.0000 |
| d3 | 1.8206 | 2.5710 | 0.7656 |
| d9 | 1.5263 | 0.7759 | 2.5813 |

Lens unit data

| Lens unit | Initial surface No. | Focal length |
|---|---|---|
| 1 | 1 | 68.63167 |
| 2 | 4 | 14.21563 |
| 3 | 10 | −17.09968 |

Numerical Example 2

The ocular optical system of Numerical Example 2 corresponds to Embodiment 2 shown in FIG. 3. Table 4 shows the surface data of the ocular optical system of Numerical Example 2. Table 5 shows the aspherical data. Table 6 shows the various data.

TABLE 4

(Surface data)

| Surface number | r | d | nd | vd |
|---|---|---|---|---|
| 0 | ∞ | Variable | | |
| 1(Virtual diaphragm) | ∞ | 12.50000 | | |
| 2* | 26.64100 | 2.82000 | 1.52470 | 56.2 |
| 3* | 98.50300 | Variable | | |
| 4* | 12.35400 | 6.48000 | 1.52470 | 56.2 |
| 5* | −10.20700 | 0.61000 | | |
| 6* | −10.49400 | 2.01000 | 1.58387 | 30.9 |
| 7* | 8.30900 | 1.31000 | | |
| 8* | 8.28800 | 7.80000 | 1.52470 | 56.2 |
| 9* | −8.55400 | Variable | | |
| 10* | −25.91000 | 1.58000 | 1.58387 | 30.9 |
| 11* | 16.75800 | 1.70000 | | |
| 12 | ∞ | 0.70000 | 1.50997 | 61.6 |
| Display surface | ∞ | | | |

TABLE 5

(Aspherical data)

Surface No. 2

K = 0.00000E+00, A4 = 8.36104E−05, A6 = 1.40116E−06,
A8 = −2.03282E−08 A10 = 1.93620E−10, A12 = −3.50960E−13,
A14 = 0.00000E+00, A16 = 0.00000E+00
Surface No. 3

K = 0.00000E+00, A4 = 2.30652E−05, A6 = −1.44453E−07,
A8 = 3.69705E−08 A10 = −1.17794E−10, A12 = −1.57261E−12,
A14 = 0.00000E+00, A16 = 0.00000E+00
Surface No. 4

K = −1.94998E−01, A4 = −9.32599E−05, A6 = −1.78506E−05,
A8 = 4.68983E−07 A10 = −4.61548E−09, A12 = 1.97091E−11,
A14 = −3.64883E−14, A16 = 0.00000E+00
Surface No. 5

K = −4.32235E−01, A4 = 8.02836E−04, A6 = −1.89610E−05,

TABLE 5-continued (Aspherical data)

A8 = 1.63160E−07 A10 = 1.70099E−09, A12 = −1.93104E−11,
A14 = −1.26086E−14, A16 = 0.00000E+00
Surface No. 6

K = −6.59812E−02, A4 = 1.54870E−03, A6 = −1.59810E−05,
A8 = −6.05020E−07 A10 = 1.74138E−08, A12 = −1.25575E−10,
A14 = −8.31988E−16, A16 = 9.58338E−16
Surface No. 7

K = −1.84106E−01, A4 = 1.34377E−03, A6 = −6.03523E−05,
A8 = 5.61549E−07 A10 = 2.11503E−09, A12 = −6.36759E−11,
A14 = 2.26021E−13, A16 = 0.00000E+00
Surface No. 8

K = −2.34867E−01, A4 = 4.14490E−04, A6 = −2.81289E−05,
A8 = 5.35892E−07 A10 = −5.52634E−09, A12 = 4.92607E−12,
A14 = 1.35686E−13, A16 = 0.00000E+00
Surface No. 9

K = −3.28439E−01, A4 = 7.97900E−04, A6 = −5.96431E−06,
A8 = 1.52739E−07 A10 = −3.68750E−09, A12 = 3.47665E−11,
A14 = −1.14715E−13, A16 = 0.00000E+00
Surface No. 10

K = 0.00000E+00, A4 = 7.37056E−05, A6 = 3.58091E−07,
A8 = −1.47121E−08 A10 = −4.66118E−09, A12 = 3.19966E−11,
A14 = 1.57026E−12, A16 = 0.00000E+00
Surface No. 11

K = 0.00000E+00, A4 = 1.26408E−04, A6 = −2.11876E−07,
A8 = −6.63658E−07 A10 = 4.95835E−09, A12 = 2.79398E−10,
A14 = −3.67795E−12, A16 = 0.00000E+00

TABLE 6

(Various data)

| Diopter scale | −1 | −4 | +4 |
|---|---|---|---|
| Focal length | 17.0339 | 18.1064 | 15.6946 |
| Pupil diameter | 4.0000 | 4.0000 | 4.0000 |
| Maximum height of display surface | 5.0000 | 5.0000 | 5.0000 |
| Overall length of optical system | 40.8786 | 40.8786 | 40.8786 |
| d0 | −1000.0000 | −250.0000 | 250.0000 |
| d3 | 1.8409 | 2.5919 | 0.7837 |
| d9 | 1.5277 | 0.7767 | 2.5849 |

Lens unit data

| Lens unit | Initial surface No. | Focal length |
|---|---|---|
| 1 | 1 | 68.66976 |
| 2 | 4 | 14.22297 |
| 3 | 10 | −17.19435 |

Numerical Example 3

The ocular optical system of Numerical Example 3 corresponds to Embodiment 3 shown in FIG. 5. Table 7 shows the surface data of the ocular optical system of Numerical Example 3. Table 8 shows the aspherical data. Table 9 shows the various data.

TABLE 7

(Surface data)

| Surface number | r | d | nd | vd |
|---|---|---|---|---|
| 0 | ∞ | Variable | | |
| 1(Virtual diaphragm) | ∞ | 12.50000 | | |
| 2* | 24.25870 | 3.20000 | 1.52470 | 56.2 |
| 3* | 88.26770 | Variable | | |
| 4* | 12.04820 | 6.49190 | 1.52470 | 56.2 |
| 5* | −10.66540 | 0.68620 | | |
| 6* | −10.90740 | 1.70000 | 1.58387 | 30.9 |
| 7* | 8.20690 | 0.70000 | | |
| 8* | 8.44390 | 8.00000 | 1.52470 | 56.2 |
| 9* | −8.51670 | Variable | | |
| 10* | −20.20950 | 1.50000 | 1.58387 | 30.9 |
| 11* | 16.96860 | 1.80000 | | |
| Display surface | ∞ | | | |

TABLE 8

(Aspherical data)

Surface No. 2

K = 0.00000E+00, A4 = 8.51678E−05, A6 = 2.22105E−06,
A8 = −2.01206E−08 A10 = 5.40628E−11, A12 = 6.55478E−13,
A14 = 0.00000E+00
Surface No. 3

K = 0.00000E+00, A4 = 4.82639E−05, A6 = 5.72236E−08,
A8 = 3.94067E−08 A10 = 8.03289E−12, A12 = −2.60787E−12,
A14 = 0.00000E+00
Surface No. 4

K = −1.40222E−02, A4 = −5.90871E−05, A6 = −1.82713E−05,
A8 = 4.68471E−07 A10 = −4.71295E−09, A12 = 1.85838E−11,
A14 = −2.03128E−14
Surface No. 5

K = −4.13186E−01, A4 = 7.75410E−04, A6 = −1.91790E−05,
A8 = 1.57777E−07 A10 = 1.68169E−09, A12 = −1.90458E−11,
A14 = −6.67682E−15
Surface No. 6

K = 1.64283E−01, A4 = 1.47887E−03, A6 = −1.67727E−05,
A8 = −5.95833E−07 A10 = 1.77023E−08, A12 = −1.21881E−10,
A14 = 2.61643E−14
Surface No. 7

K = −2.10063E−01, A4 = 1.25299E−03, A6 = −5.84307E−05,
A8 = 5.81611E−07 A10 = 2.37704E−09, A12 = −6.19814E−11,
A14 = 1.28786E−13
Surface No. 8

K = −1.48090E−01, A4 = 4.19777E−04, A6 = −2.96119E−05,
A8 = 5.66982E−07 A10 = −5.02257E−09, A12 = 5.74362E−12,
A14 = 3.90851E−14
Surface No. 9

K = −3.66780E−01, A4 = 8.00058E−04, A6 = −5.19266E−06,
A8 = 1.51444E−07 A10 = −3.85936E−09, A12 = 3.34792E−11,
A14 = −5.18233E−14
Surface No. 10

K = 0.00000E+00, A4 = −9.74976E−05, A6 = −2.31222E−06,
A8 = −7.86624E−09 A10 = −1.91567E−09, A12 = 9.86372E−11,
A14 = 0.00000E+00
Surface No. 11

K = 0.00000E+00, A4 = −3.77825E−04, A6 = 5.66935E−07,
A8 = −4.53873E−07 A10 = 2.24401E−09, A12 = 2.11161E−10,
A14 = 0.00000E+00

TABLE 9

(Various data)

| Diopter scale | −1 | −4 | +4 |
|---|---|---|---|
| Focal length | 17.0170 | 18.1943 | 15.5556 |
| Pupil diameter | 4.0000 | 4.0000 | 4.0000 |
| Maximum height of display surface | 5.0000 | 5.0000 | 5.0000 |
| Overall length of optical system | 39.8931 | 39.8931 | 39.8931 |
| d0 | −1000.0000 | −250.0000 | 250.0000 |
| d3 | 1.8367 | 2.5900 | 0.7703 |
| d9 | 1.4783 | 0.7250 | 2.5447 |

Lens unit data

| Lens unit. | Initial surface no | Focal length |
|---|---|---|
| 1 | 1 | 62.67736 |
| 2 | 4 | 14.45650 |
| 3 | 10 | −15.56644 |

Numerical Example 4

The ocular optical system of Numerical Example 4 corresponds to Embodiment 4 shown in FIG. 7. Table 10 shows the surface data of the ocular optical system of Numerical Example 4. Table 11 shows the aspherical data. Table 12 shows the various data.

TABLE 10

(Surface data)

| Surface number | r | d | nd | vd |
|---|---|---|---|---|
| 0 | ∞ | Variable | | |
| 1(Virtual diaphragm) | ∞ | 12.50000 | | |
| 2* | −45.11010 | 2.80000 | 1.52470 | 56.2 |
| 3* | −12.81510 | Variable | | |
| 4* | 15.75730 | 6.49190 | 1.52470 | 56.2 |
| 5* | −13.60420 | 0.76330 | | |
| 6* | −11.98990 | 1.70000 | 1.58387 | 30.9 |
| 7* | 7.99350 | 0.93190 | | |
| 8* | 8.49320 | 7.50000 | 1.52470 | 56.2 |
| 9* | −8.77570 | Variable | | |
| 10* | −21.44360 | 1.50000 | 1.58387 | 30.9 |
| 11* | 13.13960 | 1.80000 | | |
| Display surface | ∞ | | | |

TABLE 11

(Aspherical data)

Surface No. 2

K = 0.00000E+00, A4 = −1.46893E−04, A6 = −8.22758E−07,
A8 = −5.18262E−08 A10 = −4.14216E−10, A12 = −2.31043E−12,
A14 = 5.67194E−14

Surface No. 3

K = 0.00000E+00, A4 = −4.25125E−05, A6 = −2.68833E−06,
A8 = 1.95879E−08 A10 = −4.11619E−11, A12 = −4.22813E−12,
A14 = −6.88455E−14

Surface No. 4

K = 0.00000E+00, A4 = 5.17460E−06, A6 = −1.82850E−05,
A8 = 4.69905E−07 A10 = −4.75216E−09, A12 = 1.86645E−11,
A14 = −1.06511E−14

Surface No. 5

K = 0.00000E+00, A4 = 6.35324E−04, A6 = −1.98312E−05,
A8 = 1.53323E−07 A10 = 1.69812E−09, A12 = −1.83343E−11,

TABLE 11-continued (Aspherical data)

A14 = −2.67482E−15

Surface No. 6

K = 1.82356E−01, A4 = 1.47681E−03, A6 = −1.74132E−05,
A8 = −5.98902E−07 A10 = 1.76705E−08, A12 = −1.22427E−10,
A14 = 1.12285E−14

Surface No. 7

K = −2.32025E−01, A4 = 1.17832E−03, A6 = −5.59180E−05,
A8 = 5.81833E−07A10 = 2.07139E−09, A12 = −6.49011E−11,
A14 = 1.59332E−13

Surface No. 8

K = −1.21984E−01, A4 = 5.38717E−04, A6 = −3.05312E−05,
A8 = 5.59969E−07 A10 = −5.00191E−09, A12 = 6.46014E−12,
A14 = 1.16466E−14

Surface No. 9

K = −4.63670E−01, A4 = 8.54904E−04, A6 = −5.62873E−06,
A8 = 1.30757E−07 A10 = −4.20305E−09, A12 = 3.36426E−11,
A14 = 2.40838E−14

Surface No. 10

K = 0.00000E+00, A4 = −2.67039E−04, A6 = −2.83907E−06,
A8 = −1.73388E−08 A10 = 7.60732E−11, A12 = 8.20810E−11,
A14 = 0.00000E+00

Surface No. 11

K = 0.00000E+00, A4 = 1.37681E−04, A6 = −1.45814E−05,
A8 = −2.23668E−07 A10 = 7.71039E−09, A12 = −4.04712E−11,
A14 = 0.00000E+00

TABLE 12

(Various data)

| Diopter scale | −1 | −4 | +4 |
|---|---|---|---|
| Focal length | 17.2872 | 18.9309 | 16.4447 |
| Pupil diameter | 4.0000 | 4.0000 | 4.0000 |
| Maximum height of display surface | 5.0000 | 5.0000 | 5.0000 |
| Overall length of optical system | 39.8700 | 39.8700 | 39.8700 |
| d0 | −1000.0000 | −250.0000 | 1000.0000 |
| d3 | 2.3029 | 3.2207 | 1.7803 |
| d9 | 1.5800 | 0.6622 | 2.1026 |

Lens unit data

| Lens unit | Initial surface No. | Focal length |
|---|---|---|
| 1 | 1 | 33.12692 |
| 2 | 4 | 16.04161 |
| 3 | 10 | −13.73448 |

The following Table 13 shows the corresponding values to the individual conditions in the ocular optical systems of each of Numerical Examples.

TABLE 13

(Values corresponding to conditions)

| | | Numerical Example | | | |
|---|---|---|---|---|---|
| | Condition | 1 | 2 | 3 | 4 |
| (1) | $(f)^2/(DSP \times Ld)$ | 2.694 | 2.692 | 2.760 | 2.891 |
| (2) | $D/f$ | 1.66 | 1.62 | 1.61 | 1.58 |
| (3) | $D_1/Ld$ | 0.48 | 0.48 | 0.36 | 0.36 |
| (4) | $f_2/f$ | 0.83 | 0.84 | 0.85 | 0.91 |

The present disclosure is applicable to a digital camera such as a digital still camera, a digital video camera, a digital single-lens reflex camera, or a mirrorless single-lens camera.

As described above, embodiments have been described as examples of art in the present disclosure. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the art in the present disclosure, it is understood that various modifications, replacements, additions, omissions, and the like can be performed in the scope of the claims or in an equivalent scope thereof.

What is claimed is:

1. An ocular optical system comprising at least five lens elements, and consisting of, in order from a display surface side to an exit side,
    a first lens unit having negative optical power,
    a second lens unit having positive optical power, and
    a third lens unit having positive optical power, wherein
    the second lens unit moves along an optical axis for adjustment of diopter scale.

2. The ocular optical system as claimed in claim 1, wherein the second lens unit comprises three lens elements.

3. The ocular optical system as claimed in claim 2, wherein the three lens elements of the second lens unit are, in order from the display surface side to the exit side, a lens element having positive optical power, a lens element having negative optical power, and a lens element having positive optical power.

4. The ocular optical system as claimed in claim 1, wherein the following condition (1) is satisfied:

$$0 < (f)2/(DSP \times Ld) < 5.0 \quad (1)$$

where f is a focal length of the entire ocular optical system when a diopter scale is −1 diopter;

DSP is an axial distance between the first lens unit and the third lens unit, and Ld is a maximum height of a display surface.

5. The ocular optical system as claimed in claim 1, wherein the following condition (2) is satisfied:

$$0 < D/f < 3.0 \quad (2)$$

where

D is an optical axial distance from a display surface to a lens surface closest to the exit side, and f is a focal length of the entire ocular optical system when a diopter scale is −1 diopter.

6. The ocular optical system as claimed in claim 1, wherein the following condition (3) is satisfied:

$$0 < D1/Ld < 2.0 \quad (3)$$

where

D1 is an optical axial distance from a display surface to a lens surface, closest to the display surface side, of the first lens unit, and Ld is a maximum height of the display surface.

7. The ocular optical system as claimed in claim 1, wherein the following condition (4) is satisfied:

$$0 < f2/f < 2.0 \quad (4)$$

where f2 is a focal length of the second lens unit, and f is a focal length of the entire ocular optical system when a diopter scale is −1 diopter.

8. A finder optical system comprising:
    a display device having a display surface on which an image is displayed; and
    an ocular optical system, wherein
    the ocular optical system is the ocular optical system as claimed in claim 1.

* * * * *